United States Patent
Dreischer et al.

(10) Patent No.: US 6,839,520 B1
(45) Date of Patent: Jan. 4, 2005

(54) METHOD AND ARRANGEMENT FOR AN INTERRUPTION-PROOF OPTICAL SATELLITE LINKAGE

(75) Inventors: Thomas Dreischer, Opfikon (CH); Johann Kellermeier, Neubiberg (DE)

(73) Assignee: Contraves Space AG, Zurich (CH)

( * ) Notice: Subject to any disclaimer, the term of this patent is extended or adjusted under 35 U.S.C. 154(b) by 580 days.

(21) Appl. No.: 09/687,670

(22) Filed: Oct. 13, 2000

Related U.S. Application Data

(63) Continuation-in-part of application No. 08/882,268, filed on Jun. 25, 1997, now Pat. No. 6,246,501.

(30) Foreign Application Priority Data

May 16, 1997 (CH) .............................................. 1153/97

(51) Int. Cl.⁷ .............................................. H04B 10/10
(52) U.S. Cl. ........................ 398/121; 398/122; 398/162
(58) Field of Search ................................. 398/121, 122, 398/129, 162

(56) References Cited

U.S. PATENT DOCUMENTS

| 6,097,522 A | * | 8/2000 | Maerki et al. | ............... | 398/122 |
| 6,271,953 B1 | * | 8/2001 | Dishman et al. | ............. | 398/129 |
| 6,297,897 B1 | * | 10/2001 | Czichy et al. | ............... | 398/122 |
| 6,462,846 B1 | * | 10/2002 | DeLong | ....................... | 398/135 |

OTHER PUBLICATIONS

Robert Marshalek, "Laser Communications Requirements Drive Cost–Effective Solutions", 1999 Isart, Sep. 9, 1999, pp1–16.*

Funkschau, *Optische Kommunikation im Weltraum* pp. 68–70 (Jan. 5, 1996) No. 2, Poing, DE.

Lambert et al., *Short–Range Multi–Terminal Satellite Crosslink Communications* (U); pp. 1170–1174; IEEE 1992.

Tsukamoto et al., *Heterodyne Optical Detection/Spatial Tracking System Using Spatial Field Pattern Matching Between Signal and Local Lights*, pp 73–87; Electronics and Communications in Japan, Part 1, Bol. 77, No. 12.

Nohara et al. *A Link Study of a Low–Earth Orbit Satellite Communications System Using Optical Intersatellite Links* pp. 536–543; 2334b IEICE Transactions on Communications E76–B (May, 1993) No. 5, Tokyo JP.

P. Brunt *IRIDIUM®—overview and status*; p. 61–68 (1996).

* cited by examiner

*Primary Examiner*—Leslie Pascal
(74) *Attorney, Agent, or Firm*—Townsend and Townsend and Crew LLP; Guy W. Chambers

(57) ABSTRACT

A method and an arrangement for the employment of free space transmission systems for interruption-proof links between individual satellites of satellite communications systems by utilizing optical terminals. The communication link between two satellites is established in a reliable manner despite the presence of microvibrations.

13 Claims, 12 Drawing Sheets

PAA ≙ point-ahead assembly

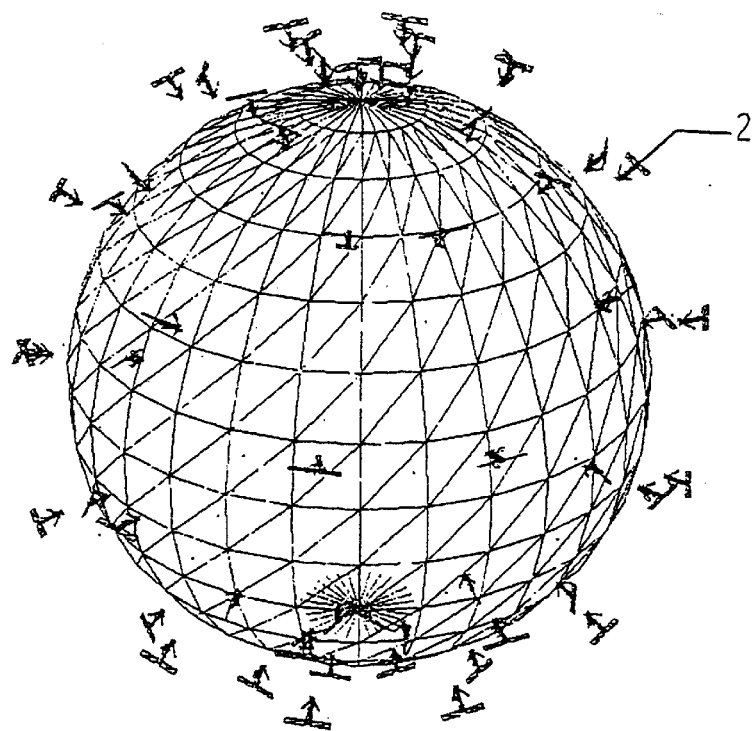
Figure 1: The IRIDIUM Network, 66 satellites
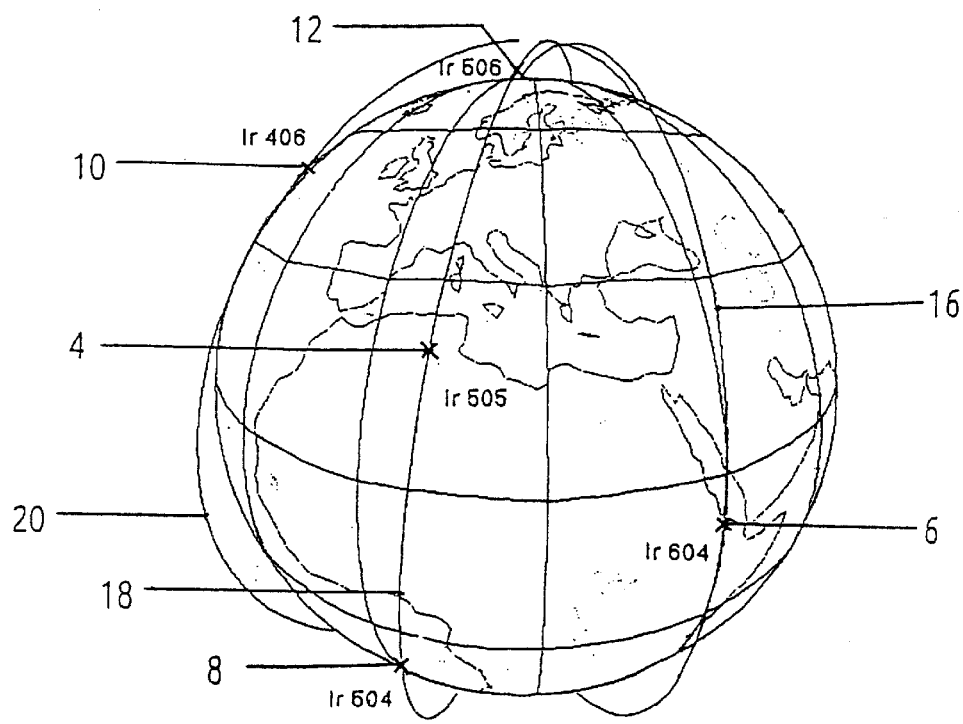
Figure 2: Perspective view of a selected group in the IRIDIUM network

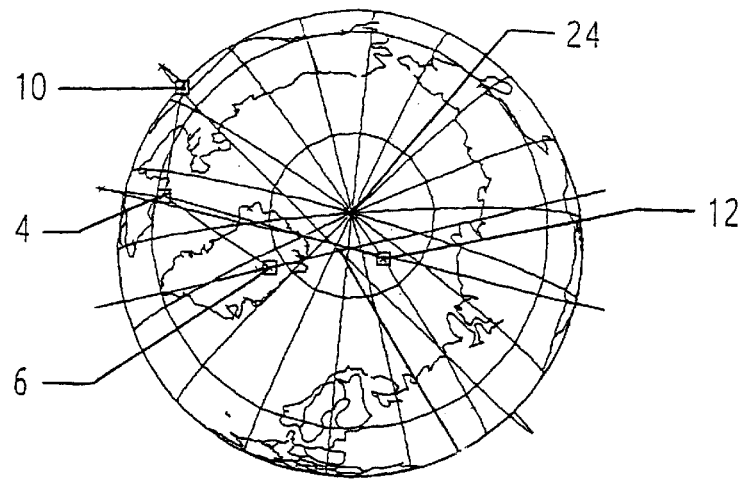
Figure 3: Prior to passing the north pole
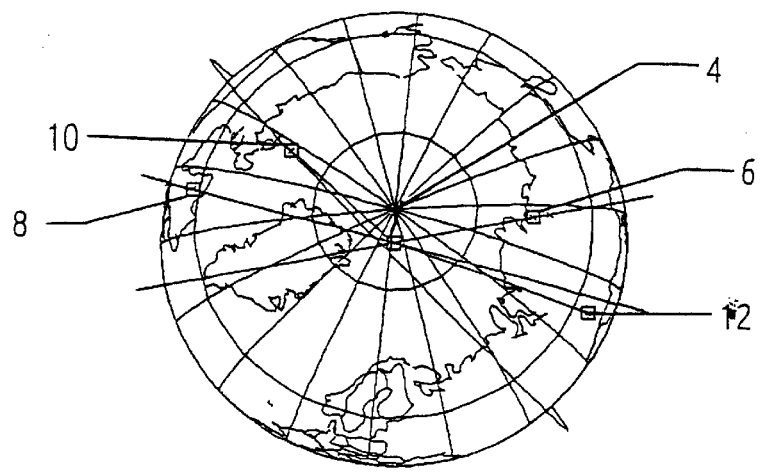
Figure 4: In the course of passing the north pole
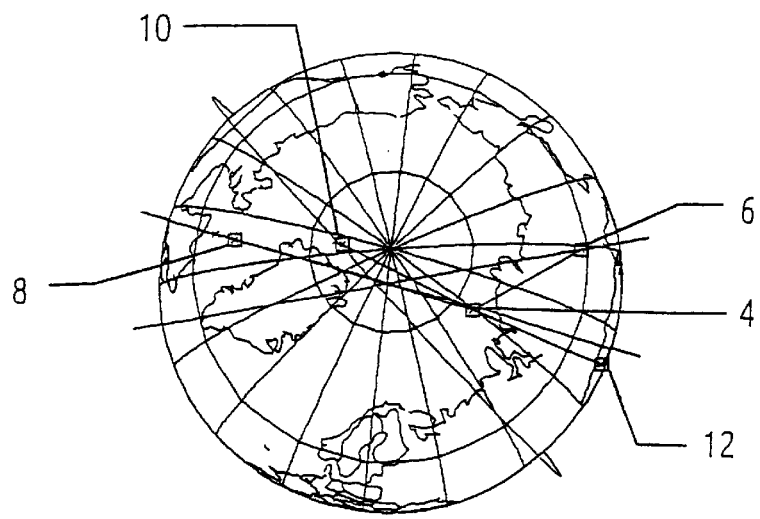
Figure 5: After passing the north pole

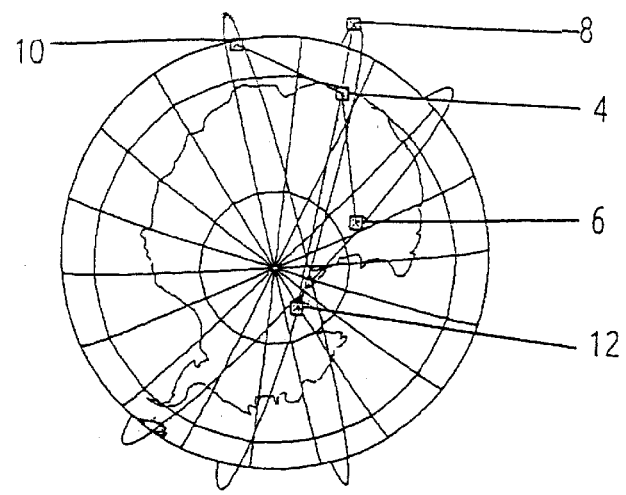
Figure 6: Prior to passing the south pole
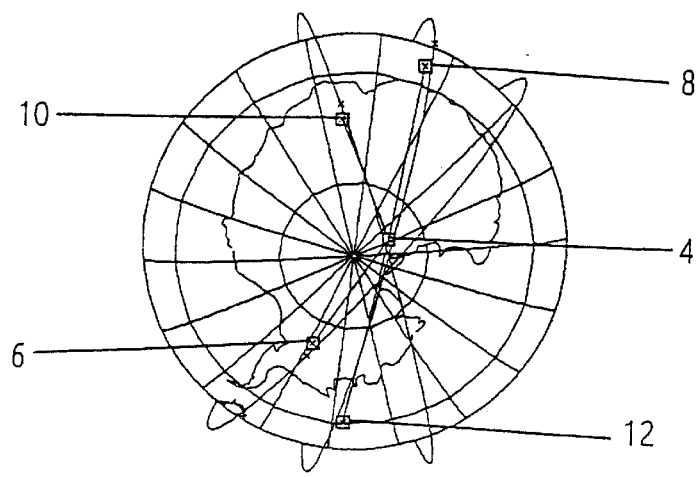
Figure 7: In the course of passing the south pole
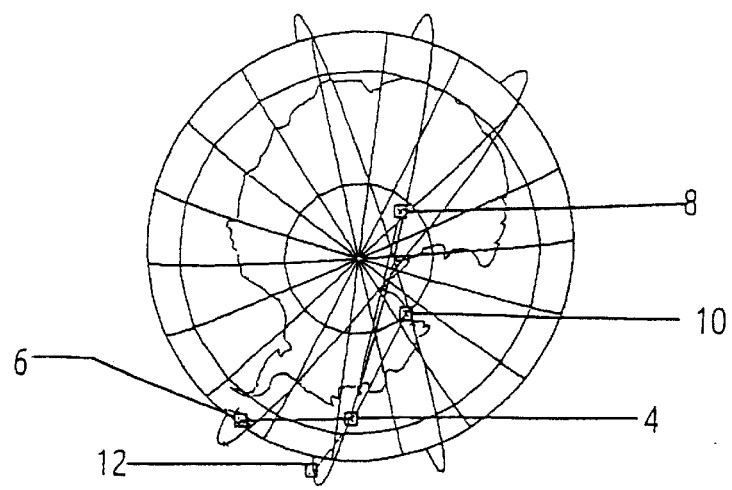
Figure 8: After passing the south pole

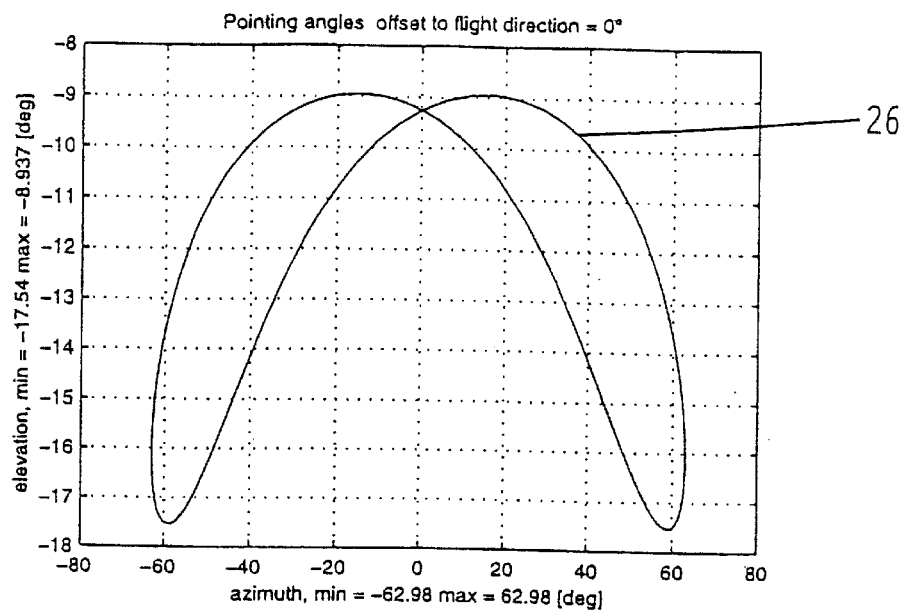
Figure 9: Azimuth and elevation angles under which the central satellite sees its neighbours in the adjoining orbits
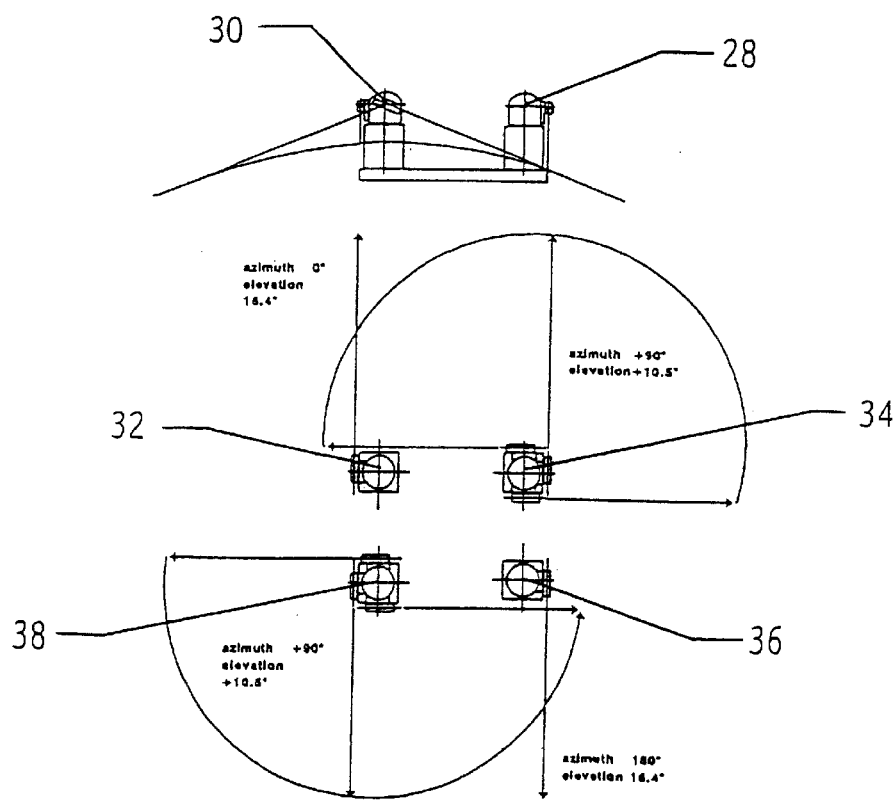
Figure 10: Four terminal configuration for IRIDIUM

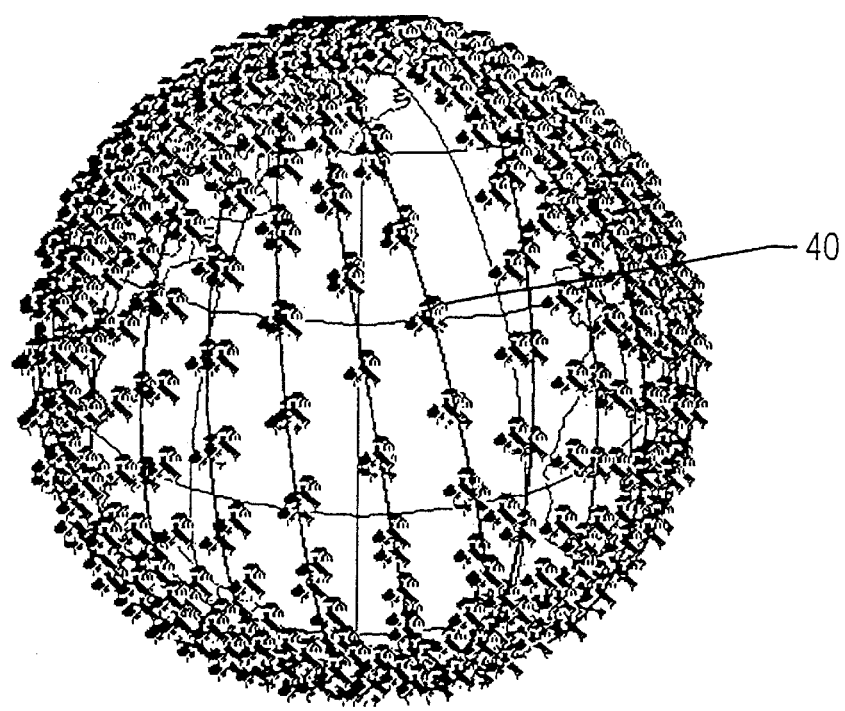
Figure 11: The TELEDESIC Network, 840 satellites
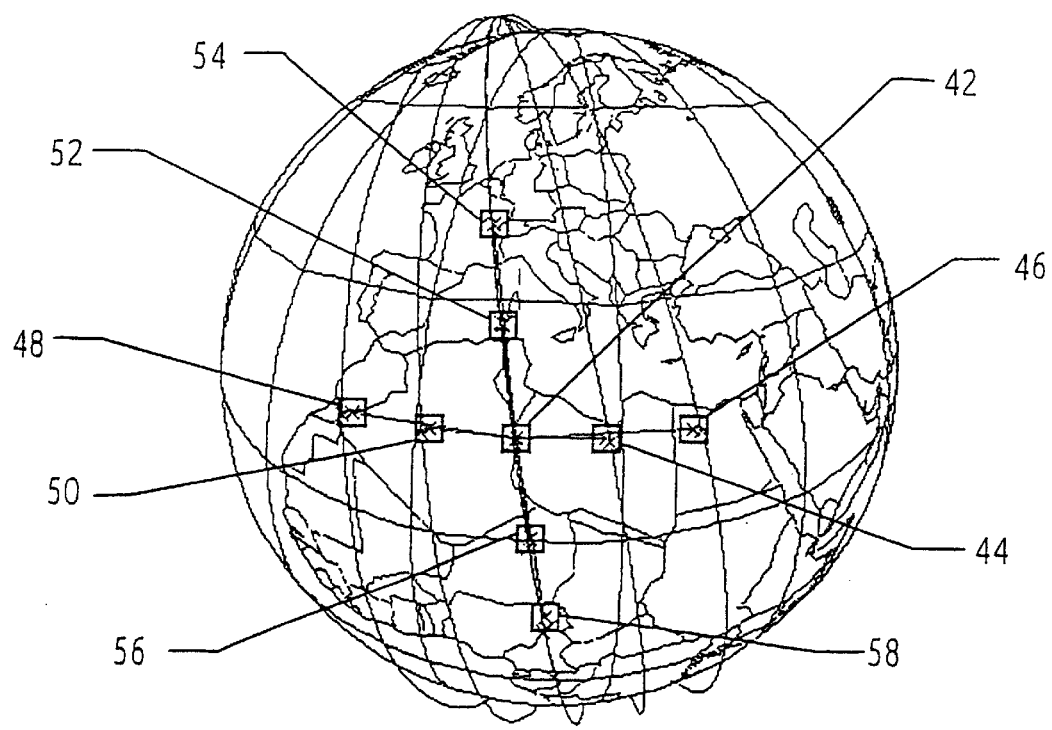
Figure 12: Perspective representation of a selected group in the TELEDESIC network

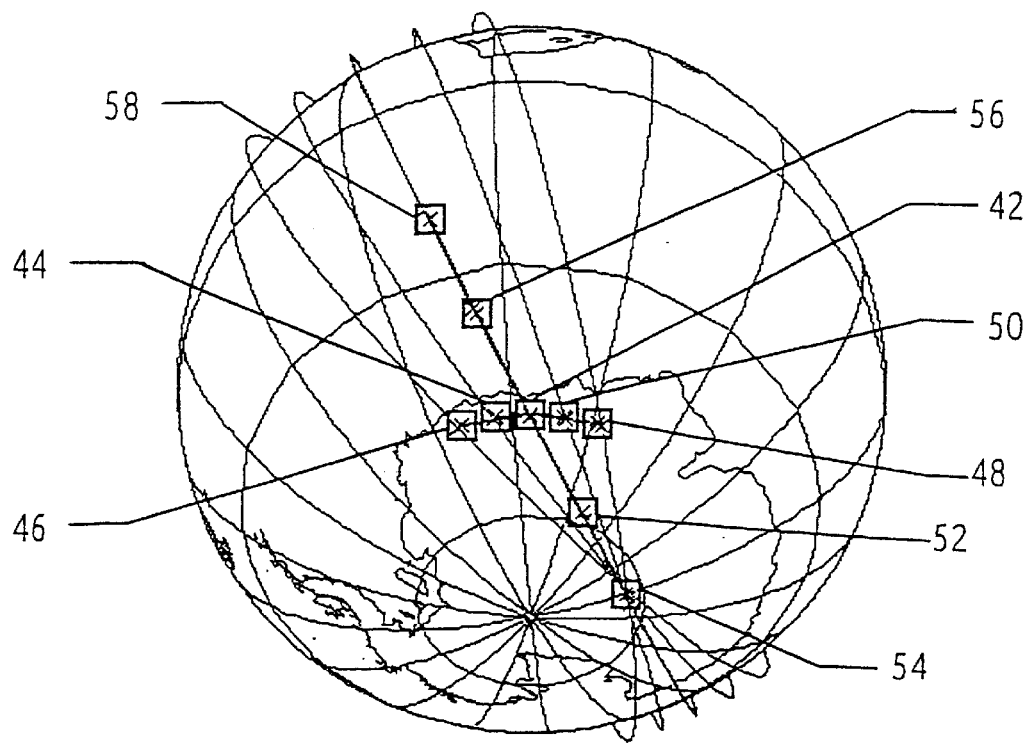
Figure 13  Prior to passing the south pole
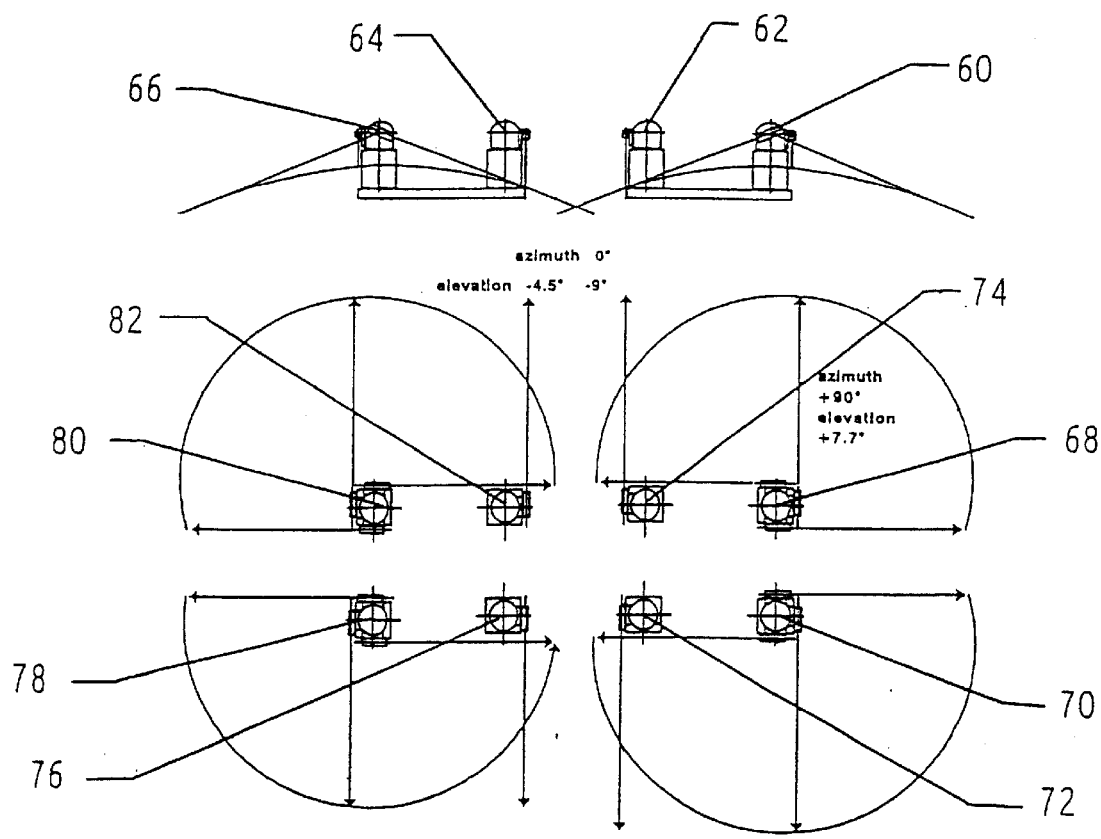
Figure 14:  Eight terminal configuration for TELEDESIC

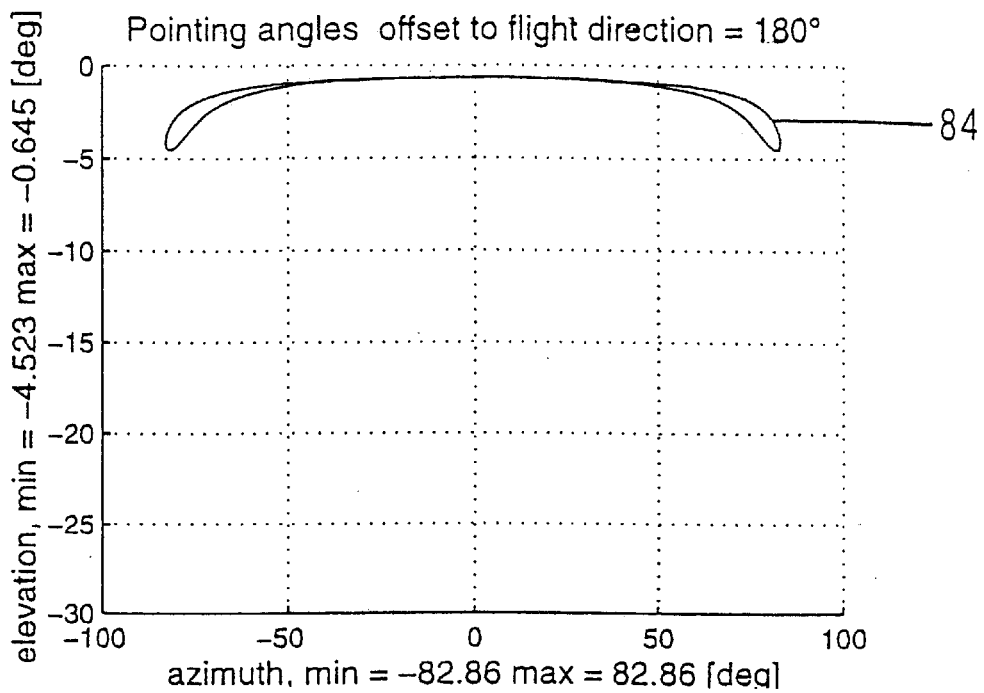
Figure 15: Azimuth and elevation angles under which the central satellite sees its neighbours in the directly adjoining right orbit
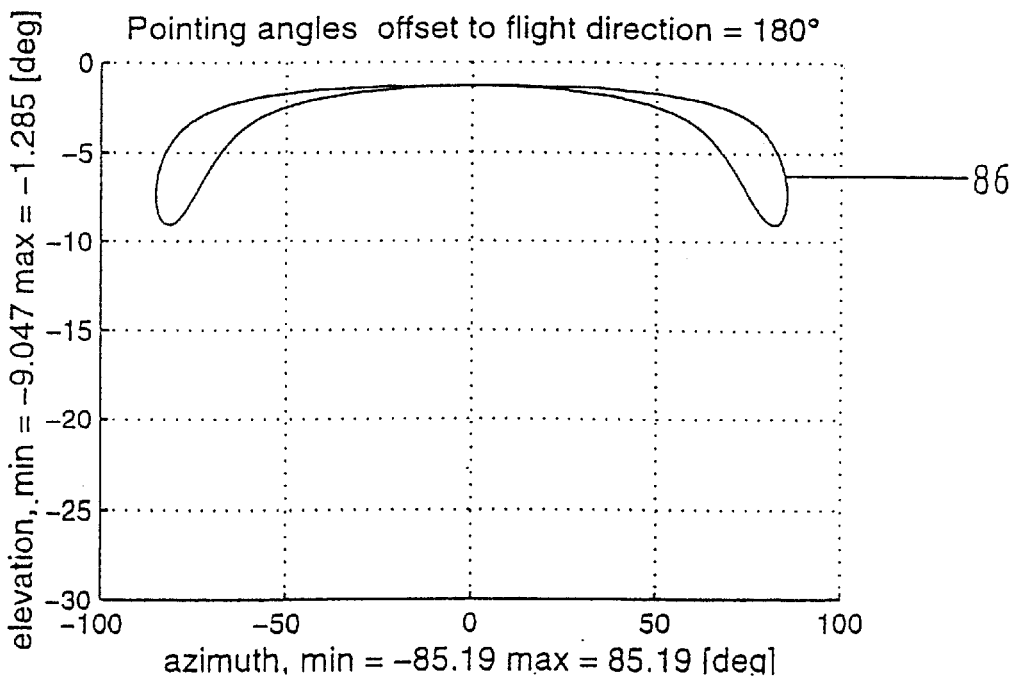
Figure 16: Azimuth and elevation angles under which the central satellite sees its neighbours in the next but one adjoining right orbit PAA ≙ point-ahead assembly

METHOD AND ARRANGEMENT FOR AN INTERRUPTION-PROOF OPTICAL SATELLITE LINKAGE

This application is a continuation-in-part (CIP) of the U.S. patent application Ser. No. 08/882,268, filed on 25 Jun. 1997 now U.S. Pat. No. 6,246,501.

FIELD OF THE INVENTION

The invention relates to a method and arrangement for the employment of optical free space transmission systems for interruption-proof linkages between individual satellites of globally accessible low earth orbiting satellite communications systems and especially to a method and arrangement for the establishment of a communication link between two satellites by means of a coarse acquisition and a fine alignment step.

BACKGROUND OF THE INVENTION

The cellular communication networks which have lately been established worldwide in many densely populated regions provide an unprecedented measure of individual accessibility in cooperation with already established landline communications networks. The economic advantages for the consumers of corresponding services arising from this justify the high costs of the infrastructure connected with this. Under normal topographic conditions, a single fixed transmission station of such a network can cover mobile users at a distance of up to approximately 20 km, wherein the given maximum extent of a cell limited by this becomes considerably smaller in an unfavorable terrain. Based on positive experiences with communications satellites in geostationary orbits, the idea suggests itself to gain by similar means the considerable independence from the terrain achieved by this, as well as the large spatial extent of the covered area, also in connection with mobile communication systems.

While, because of the development of very low noise preamplifiers and mixers, radio reception from geostatic satellites became possible even with relatively small antennas, in connection with bidirectional linkages the problem of transmitting acceptable data rates over very large distances (approximately 36,000 km) by means of antennas transmitting almost non-directionally and at very low transmission output to the geostationary satellite remains. A solution of this problem lies in the use of satellites circling relatively low above the earth's surface, whose limited range is compensated by the presence of a multitude of identical satellites, which exchange information with each other and pass it on. Several concrete proposals already exist, among these are the IRIDIUM-concept (P. Brunt, "Iridium: Overview and Status", in Space Communications, vol. 14, No. 2, 1996, pp. 61 to 68), and M-STAR and TELEDESIC (System Description Excerpt, Mar. 21, 1994).

A characteristic of all mentioned systems is the employment of a multitude of satellites moving in low orbits around the earth which, divided into sub-groups, are respectively evenly distributed over an orbit, which is distinguished in that it penetrates the plane containing the earth's equator at two points at an obtuse angle. The orbits of all satellites are arranged in respect to each other in such a way that an even coverage of the earth's surface by satellites is achieved. The orbits taken up by the satellites intercept each other in two points as a function of the inclination of the orbit. At the same altitude of all paths, a collision of satellites in different orbits is prevented by so-called inter-plane phasing and a selection of angles of the inclination of the individual orbital planes which is unlike 90°. At this time, the linkage of the individual satellites with each other takes place by means of appropriately aligned directional microwave antennas. This does not present a problem in connection with satellites in the same orbit, since the distance as well as the direction of the neighboring satellites are relatively stable. However, the situation becomes complicated with linkages with satellites of neighboring orbits.

In the course of one circumnavigation of the earth, a lateral change of the satellites flying along in neighboring orbits occurs at the intersections of all orbits. If there is a radio linkage with the satellites located laterally in respect to the direction of flight, it is necessary to perform tracking with the directional antenna over a larger angular spatial range as soon as the reception output falls below a minimum or, if this is not possible, a transfer to an antenna placed in a different direction must take place. The change of the directions of the neighboring satellites can take place almost instantaneously, if they are located nearly crosswise to the direction of flight. Therefore, under normal circumstances a transfer to another antenna takes place, because of which a contactless phase results because of the required acquisition time.

Also, rapid rotating movements of bodies (e.g., optical terminals) of large mass and spatial expanse, which are attached to the satellite body, add to the destabilization of the latter. Finally, the limited extent of the directional antennas results in the transmission of energy over a comparatively large spatial angle, even when using microwaves, because of which as many different transmission channels as possible must be available in view of a situation of high density of satellites occurring on account of the closeness of the intersecting points of all orbits. This forces a limitation of the bandwidth of the individual channels because of the limited bandwidth of the directional microwave antennas employed. However, this is unacceptable for the linkage of the satellites with each other (inter-satellite links), since information from other satellites is also passed on via these linkages, so that the flow of information has to be considerably higher than in the traffic between the ground and the satellites.

Today, many high bandwidth communication satellite networks are planned for future use. Most networks are intended to operate in a geostationary orbit (GEO). Other satellite networks are planned which will be operable in different kinds of orbits, i.e. in a low earth orbit (LEO), in a medium earth orbit (MEO), and in a high earth orbit (HEO). All networks aim at providing high bandwidth communication services for communication between satellites.

Satellite networks, as mentioned above, and other planned satellite networks offering high bandwidth communication services intend to use optical intersatellite links between different satellites, in order to establish a switching network in the space segment where the satellites are located. Such optical inter-satellite links are characterized in that they require high precision pointing methods and devices for the beam to be emitted, reaching over distances which may be as large as several thousands of kilometers, up to 80'000 kilometers, and allowing only extremely small angular deviations of the beam around a line of sight (LoS) remaining in the range of several micro-degrees.

In a common approach used to establish a coherent inter-satellite optical link, an electro-opto-mechanical multi-step acquisition procedure is applied. In this acquisition procedure, the laser beam to be received is first caught and then focussed on the receiver element. The acquisition procedure basically can be divided in two acquisition phases, a first phase (coarse acquisition phase) and a second phase (fine alignment phase). Usually, after completion of the fine alignment phase, the satellite terminals are ready for the transfer of nominal data (payload) and the communication phase is entered.

It is known in the art to use two laser beams with different laser wavelengths during the acquisition procedure, a first wavelength (L1) for coarse acquisition and a second wavelength (L2) for fine alignment. The first laser wavelength (L1) is received by direct detection means and the second laser wavelength (L2) is received by coherent detection means.

What matters is the use of two different detection schemes, direct detection and coherent detection, during the acquisition procedure. Direct detection stands usually for a wide field-of-regard. The coherent detection is applied to detect a laser beam that usually is narrow and therefore allows only for a much smaller field-of-regard (FoR). In this context, direct detection is understood to be a method of direct conversion from received optical power emitted by the terminal of a first satellite to an electrical position signal in the terminal of a partner satellite. The coherent detection is understood to represent a method that derives an electrical position signal in the partner satellite's terminal from the optical power received from the first satellite's terminal after superposition of the received optical power with a local oscillator laser in the partner terminal.

Generally, the transition between the two phases—the coarse acquisition phase and the fine alignment phase—represents a critical moment. Special attention has to be given to finding laser beam at the beginning of the fine alignment phase where coherent detection is starting in a field-of-regard that is about one order of magnitude smaller than the field-of-regard of the direct detection sensor at the end of the coarse acquisition phase. Additionally, it has to be considered that the terminals of both satellites involved, the emitting terminal as well as the receiving or partner terminal, are in rest but are exposed to micro-vibrations due to mechanical disturbances coupled in from the host satellite mechanical interface. These micro-vibrations are also called satellite-induced vibrations. Vibrations and other disturbances are referred to as transient impacts.

OBJECT AND SUMMARY OF THE INVENTION

It is therefore the object of the present invention to provide a scheme for reliable establishment of an intersatellite link despite of transient impacts.

It is another object of the present invention to avoid, or at least to mitigate, possible disadvantages due to spacecraft/satellite induced vibrations during the transition phase between a coarse acquisition phase and a subsequent fine alignment phase.

The basic concept of the invention lies in the replacement of certain transmitting devices based on microwaves on board the satellites utilized in the above mentioned systems by optical communications terminals. These optical communications terminals are installed in a fourfold (or a specific other) arrangement on each satellite and contain a transmission device intended for transmission and reception, which is designed to be rotatable in azimuth and elevation by means of an optical head. Terminals in accordance with the invention are applied to the exterior surfaces of the satellite respectively both in the direction of movement and opposite the direction of movement of the satellite in such a way that the zero azimuth alignment of their telescopes coincides with the tangent of the orbit described by the satellite.

A method for the interruption-proof operation of communication links between satellites in inter-satellite networks is proposed. A combination of coherent detection and direct detection implemented to control transient (microvibrational) impacts on the pointing accuracy during the establishment of such a communication link.

In other words, an optical inter-satellite communication link for the transfer of nominal data between a first satellite terminal and a second satellite terminal is established whereby in the second satellite terminal direct detection is applied to detect a first light beam emitted by the first satellite terminal for coarse acquisition and coherent detection is applied to detect a second light beam emitted by the first satellite terminal for fine alignment and for nominal communication.

A terminal system for establishing an optical inter-satellite communication link for receiving nominal data from a first satellite terminal is proposed. The terminal system comprises means for coarse acquisition using a first laser beams, means for fine alignment of the terminal system with respect to the first satellite terminal, and means for receiving the nominal data from the first satellite terminal. The fine alignment is achievable by establishing a service channel using the first laser beams.

Further configurations can contain any arbitrary number of terminals, in particular for the simultaneous maintenance of more than two links with neighboring satellites. Furthermore, in addition to other current systems, the homodyne method is provided for a data exchange between two satellites, which is unaffected by foreign light sources. It is possible in this way to also detect the signal of a satellite located directly in front of the sun. In the course of passing through the intersection points of all orbits, the contact made with a satellite which is in another, lateral orbit is maintained by tracking by means of the telescope, which is rotatable around two axes and is small and light. Tracking is also performed by means of coherently detected difference signals, and is therefore unaffected by interferences caused by the sun or other external light sources. Furthermore, the optical output of the light beam transmitted from an optical terminal is concentrated in a very narrow angular range.

The very exact alignment of the light beam with the desired satellite required because this simultaneously provides the advantage of interference-free communication with satellites arranged at a short mutual distance, such as is the case in the area of intersecting orbits.

A further advantage resides in the extreme large bandwidths which can be made available by optical communications. For example, at a wavelength of 1500 nm a spectral segment of a width of 1 nm in the frequency range represents a bandwidth of approximately 130 GHz. Line-dependent optical transmission systems, which are exposed to the adversities of the transmitting medium, in particular the dispersion of the group delay time, allow the transmission of several hundred Gbits per second. By means of the optical linkage of the satellites (intersatellite links) of the above described systems it is possible to release the bandwidth in the microwave spectrum for the communication between the earth and the satellite, wherein the increase in the data flow between the satellites caused by this can be handled without problems by the optical systems proposed herein.

Further details, characteristics and advantages of the invention ensure not only from the claims and the features to be found therein, either by themselves and/or in combination, but also from the following description of preferred exemplary embodiments.

BRIEF DESCRIPTION OF THE DRAWINGS

FIG. 1 shows the IRIDIUM network consisting of sixty-six satellites,

FIG. 2 is the perspective representation of a selected group of satellites of the IRIDIUM network, FIG. 3 represents the group in FIG. 2 prior to passing the north pole, FIG. 4 represents the group in FIG. 2 in the course of passing the north pole, FIG. 5 represents the group in FIG. 2 after passing the north pole, FIG. 6 represents the group in FIG. 2 prior to passing the south pole, FIG. 7 represents the group in FIG. 2 in the course of passing the south pole, FIG. 8 represents the group in FIG. 2 after passing the south pole, FIG. 9 is a diagram of the azimuth and elevation coverage angle of the nearest neighboring IRIDIUM satellite in another orbit, FIG. 10 shows a configuration for IRIDIUM consisting of 4 terminals, FIG. 11 represents the TELEDESIC network consisting of 840 satellites, FIG. 12 is the perspective representation of a selected group of satellites of the TELEDESIC network, FIG. 13 shows the group of FIG. 12 prior to passing the south pole, FIG. 14 represents a configuration for TELEDESIC consisting of eight terminals, FIG. 15 is a diagram of the azimuth and elevation coverage angle of the nearest neighboring TELEDESIC satellite in another orbit, FIG. 16 is a diagram of the azimuth and elevation coverage angle of the next but one neighboring TELEDESIC satellite in another orbit.

DESCRIPTION OF THE PREFERRED EMBODIMENTS

Figure 17:
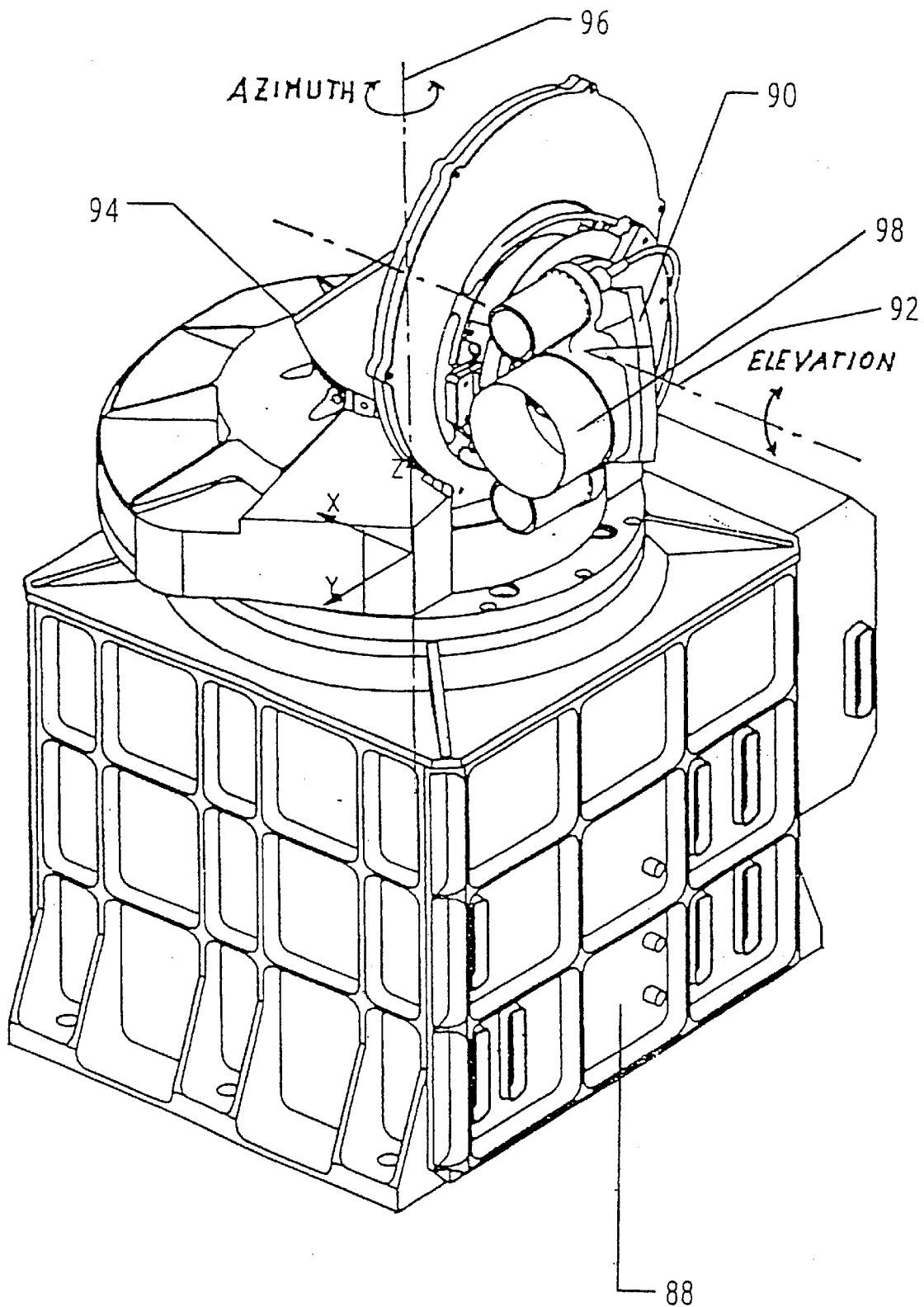
FIG. 17 represents a first exemplary embodiment of an optical terminal.

The sixty-six satellites 2 of the IRIDIUM network are schematically represented in their orbits around the earth in FIG. 1. To clearly show the structure of the network between the individual satellites, only one group of satellites directly connected with each other by communications links is represented in FIG. 2. A satellite 4 is the central element of this group, which is connected with satellites 12 and 8 which precede and follow it in its own orbit 18. Two further satellites 10 and 6 located in neighboring orbits 20 and 16, together with the satellite 4, form paths which form an angle of approximately 3000 or approximately 1200 with the tangent at the orbit of the satellite 4. In this representation the ensemble constituted by the satellites 4, 6, 10 and 12, together with the paths symbolizing the links, passes through one intersection of all orbits of IRIDIUM satellites, which is located in the vicinity of the north pole 24 (FIG. 3) wherein the angle between the tangent at the orbit in the position of the satellite 4 and the paths to the satellites 6 and 10 moving in the neighboring orbits changes in the course of a lateral change of the satellites 6 and 10.

FIGS. 4 and 5 represent two further phases in the area of the orbits intersecting in the vicinity of the north pole, while the same situation in the vicinity of the south pole is represented in FIGS. 6 to 8.

FIGS. 6 to 8 show the ensemble of satellites known from FIGS. 2 to 5 prior to, during and after passing the intersection point located in the vicinity of the south pole of the orbits through the central satellite 4.

A curve represented in FIG. 9 shows, from the perspective of the satellite 4, the azimuth and elevation coverage angle of a satellite 6 or 10 moving along in a neighboring orbit, which passes through the intersection points of all orbits in front of or after the satellite 4, during a full orbit around the earth. The elevation coverage angle along the curve 26 changes by less than twice its minimal value, so that the mutual distance between the satellites 6 or 10 and 4 is also sufficiently great when passing through the intersection point of the orbits in order not to cause an abrupt angular change of the paths between the satellites 6 or 10 and 4.

The communication terminals required for optical links can be attached to the satellite in the manner represented in FIG. 10. While one optical terminal 32 maintains the linkage with the satellite 12 moving in front in the same orbit, the satellite 8 moving behind in the same orbit is covered by a further optical terminal 36. The two further optical terminals 34 and 38 cover the area of the satellite which is to the left or right in the direction of movement and therefore the nearest satellites 10 and 6 which move along in the neighboring orbits. Due to the physical nature movements of satellites in lateral orbital planes, 10 and 6, with respect to satellite 4, the satellite appearing on the left can be tracked interruption proof by the optical terminal 34, looking in direction of the movement of satellite 4 and the satellite appearing on the right can be tracked interruption-proof by the optical terminal 38, looking opposite the direction of the movement of satellite 4.

This applies as the lateral satellites 10 and 6 turn out to move in the way of pendulums which swing around the tangent to the orbital plane for and after satellite 4, due to the existence of the two intersection zones of all orbital planes which occur in each LEO network.

For this reason it is possible by means of both optical terminals 34 and 38 to follow without interruption the satellites 6 and 10 moving along in neighboring orbits over the intersection points of the orbits, from which the continuous availability of the optical transmission path results. A front or a rear view of the arrangement of the optical terminal shows an optical terminal 28 for maintaining the linkage with a satellite moving in front or behind in the same orbit, and an optical terminal 30, whose connecting path, starting at this terminal, with a satellite optionally moving along to the right or left is shown in the form of two lines.

FIG. 11 represents the completely installed TELEDESIC satellite network with 840 satellites 40. A selected group of TELEDESIC satellites, which are linked with each other, is represented in FIG. 12. The depth of linkage of individual groups is greater than with IRIDIUM, respectively two satellites 52 and 54 or 56 and 58, moving in front or behind in the same orbit, as well as satellites 44 and 46 or 50 and 48, located in neighboring orbits to the right or left, are connected with a central satellite 42 of the group.

FIG. 13 shows the group of satellites in FIG. 12 prior to passage of the intersection point of all orbits located in the vicinity of the south pole, in which a satellite 54 is located.

FIG. 14 shows a corresponding arrangement of the required optical terminals on the satellite 42. The optical terminals 74 and 82 maintain the linkages with the two satellites 52 and 54, which move in front in the same orbit, further optical terminals 72 and 76 are directed to the two satellites 56 and 58 moving behind in the same orbit. Additional optical terminals 78 and 80 or 68 and 70 maintain the linkage with the two nearest satellites moving to the left or right of the orbit of the central satellite 42. As can be seen from the front or rear views of the arrangement of the optical terminals, because of the required optical coverage angle as well as their distance from each other on the satellite body, optical terminals 60 and 66, provided for the linkage with satellites moving in lateral orbits and grouped next to the optical terminals 62 and 64, which are attached for satellites moving ahead or behind in the own orbit, cover satellites moving along on both sides. By means of this it is also possible to track satellites moving along on the side without chronological gaps in the course of one circumnavigation of the earth.

FIG. 15 shows the azimuth as well as the elevation coverage angles which the connecting line to the satellites 44 and 50 describes in the course of a full circumnavigation of the group of the earth, provided the satellites 44 and 50 pass first through the intersection points of the orbits. When the central satellite 42 passes the intersection points of all orbits, the curve 84 indicates an elevation coverage angle of approximately 1° which, with the strong curvature of near-earth orbits, suggests a short distance between the satellites. Azimuth coverage angles of approximately 90° while the group passes over low latitudes of the earth therefore suggest a very rapid change in the direction of the satellites moving along on the right or left which, however, can still be managed with a small and light optical terminal.

An analogous curve 86 for the satellites 46 and 48, which are respectively the next but one in neighboring orbits, is represented in FIG. 16. In spite of an only slightly greater elevation coverage angle of approximately 2° at the intersection point, the small structural size of the optical terminals 60 and 66, together with their arrangement in accordance with FIG. 14, where they are offset in respect to each other, assures the gap-less tracking of satellites moving laterally along over a full circumnavigation of the earth of the entire group without blocking each other.

The structure of an optical terminal is represented in FIG. 17. A housing 88 contains, besides elements of the electronic devices required for control and signal processing, essential elements of the optical system, which is described in detail in Swiss Patent Application 0548/97. In addition to various detectors and sensors, there is space for an essential portion of the telescope, the alignment of which can be controlled by means of rotatable deflecting mirrors. An opening 98, which can be aligned, of the telescope can be adjusted in elevation by means of a mirror 90 rotatable around an elevation axis 92, and in its azimuth angle by means of a mirror 94 rotatable around an azimuth axis 96.

Figure 18:
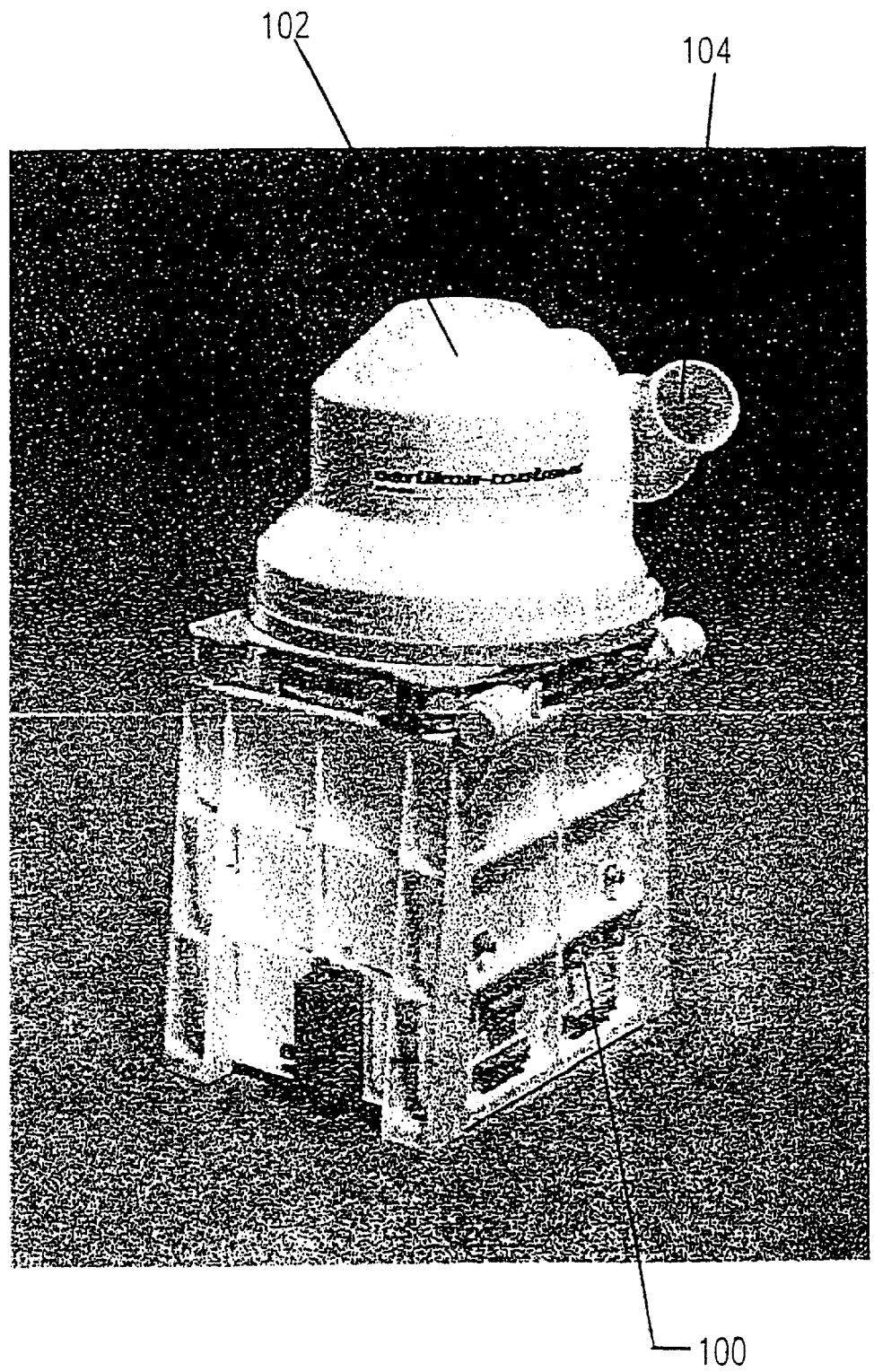
FIG. 18 represents a second exemplary embodiment of an optical terminal.

The further embodiment of an optical terminal represented in FIG. 18 has a structure similar to that represented in FIG. 17. An adjustable opening 104 of a telescope is, similar to FIG. 17, attached to a mirror rotatable around an elevation axis and is connected with a body 102, which is rotatable around an azimuth coverage angle axis and rests on a housing 100.

Before a communication link between the laser terminals of two satellites can be established, the terminals' line-of-sight (LoS) must be aligned. According to the present invention, this is accomplished in three steps: pointing, acquisition and tracking (PAT). For acquisition, the terminals use a beacon laser. According to the present invention, service information is transmitted on the beacon beam during the acquisition phase to support the establishment of the link.

Figure 19:
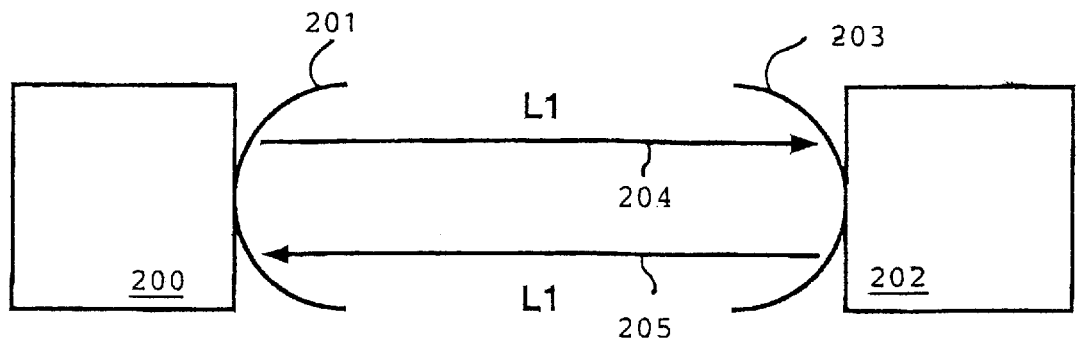
FIG. 19 illustrates the coarse acquisition procedure, according to the present invention, for establishing an intersatellite communication link between a terminal of a first satellite and a terminal of a second satellite.

The acquisition procedure according to the present invention is described in connection with FIG. 19 and FIG. 20. There is a first satellite which carries the optical terminal 200 with an optical antenna 201. A remote second satellite (herein also referred to as partner satellite) comprises an optical terminal 202 with an optical antenna 203. The optical terminals 200, 202 have transmission devices intended for transmission and reception, which are designed to be rotatable in azimuth and elevation by means of an optical head. Terminals 200, 202 in accordance with the invention are applied to the exterior surfaces of the satellite respectively, both in the direction of movement and opposite the direction of movement of the satellite in such a way that the zero azimuth alignment of their optical antennas 201, 203 coincides with the tangent of the orbit described by the satellite.

It now has to be considered that the terminals 200, 202 of two satellites involved, the emitting terminal 200 as well as the receiving or partner terminal 202 are in rest but are exposed to micro-vibrations due to mechanical disturbances coupled in from the host satellite. These satellite-induced vibrations are up to two orders of magnitude greater than the width of the light beams 206, 207 (laser beam) employed for the inter-satellite communication. These transient impacts make it extremely difficult to establish and/or maintain inter-satellite communication links.

According to the present invention, an acquisition procedure is proposed for optical alignment of the terminal 200, 201 with respect to the remote terminal 202, 203. The first step of this acquisition procedure (coarse acquisition procedure) is illustrated in FIG. 19. The terminal 200, 201 emits a beacon light beam 204 that has a large beam width. The wavelength of this light beam 204 is L1. Due to the large beam width of the beam 204, this light beam 204 has not to be pointed at the partner terminal 202, 203 with highest accuracy. A direct detection scheme is employed at the partner terminal 202, 203 in order to detect the beacon light beam 204. The partner terminal 202, 203 has direct detection sensors for receiving the beacon light beam 204 transmitted by the terminal 200, 201. A feedback loop is established by returning the beacon light beam 205 from the partner terminal 202, 203 to the terminal 200, 201. The terminal 200, 201 has direct detection sensors for receiving the beacon light beam 205 returned by the partner terminal 202, 203. The wavelength of this light beam 205 is L1, too.

During this coarse acquisition procedure the optical heads of the two terminals 200, 201 and 202, 203 are adjusted with respect to each other's position until an acceptable alignment is achieved.

In a subsequent procedure, referred to as fine alignment procedure, a second light beam 206 is emitted by the terminal 200, 201 towards the partner terminal 202, 203. This procedure is schematically illustrated in FIG. 20. The second light beam 206 has a very narrow beam width, i.e., this light beam 206 is tightly focussed when compared to L1. The beam width of the second light beam 206 is between 50 and 1000, preferably about 100, times narrower than the beam width of the first light beam 204. Since a coarse alignment between the terminal 200, 201 and the partner terminal 202, 203 was achieved during the coarse acquisition procedure, the second light beam 206 can be directed precisely towards the antenna 203 of the partner terminal 202. The second light beam 206 is transmitted in a direction parallel to the direction of the first light beam 204. Due to the transient impacts, however, it is highly unlikely that the second light beam 206 hits the receiving dector.

According to the present invention, the first light beam 204 is now additionally used to establish a service channel between the terminal 200, 201 and the partner terminal 202, 203. This service channel is used to transmit information from the terminal 200, 201 to the terminal 202, 203. In FIG. 20 the service channel is illustrated by frames 208 that are conveyed via the beacon light beam 204 to the terminal 202, 203. The optical head of the first terminal 200, 201 is caused to perform a scan movement while the light beam 206 is emitted.

Figure 20:
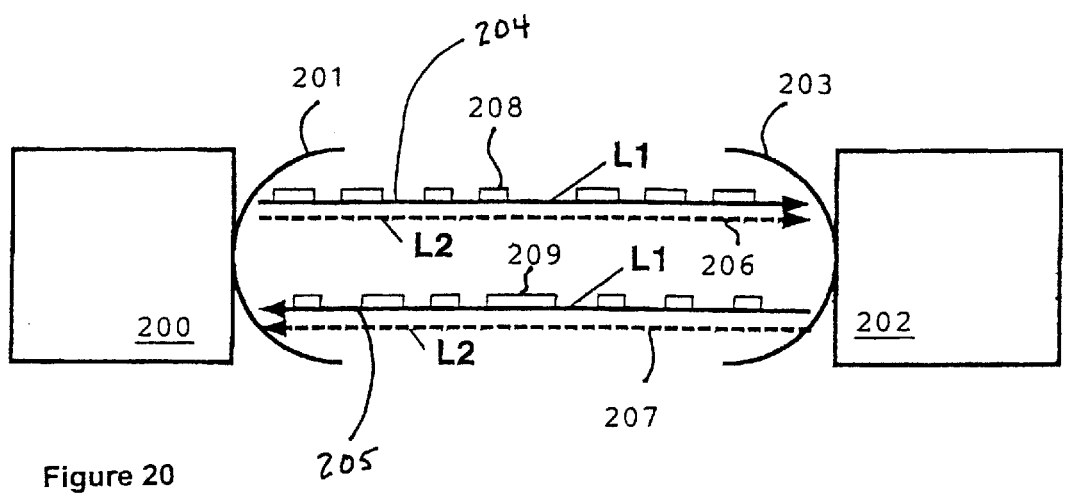
FIG. 20 illustrates the fine alignment procedure, according to the present invention, for establishing an intersatellite communication link between a terminal of a first satellite and a terminal of a second satellite.

As shown in FIG. 20, the partner terminal 202, 203 also establishes a service channel that conveys frames 209 from the terminal 202, 203' back to the terminal 200, 201. The service channel uses the Beacon laser 205(L1) as transmission path in order to facilitate acquisition in the optical communication system during the handover phase from acquisition into tracking, called beam trapping. According to the present invention, this service channel is used to feed information concerning the satellites' alignment back to the terminal 200, 201. By the exchange of service information conveyed by means of frames 208 and 209, a control loop is established that allows the scan movement of the first terminal's optical head to be controlled until the partner terminal 202, 203 is able to detect the very narrow second light beam 206. A coherent detection scheme is employed at the partner terminal 202, 203 in order to detect the second beam 206. For this purpose the partner terminal 202, 203 has coherent detection sensors. The terminal 200, 201 also has coherent detection sensors for detection of the very narrow light beam 207 which is emitted by the terminal 202, 203.

Figure 21:
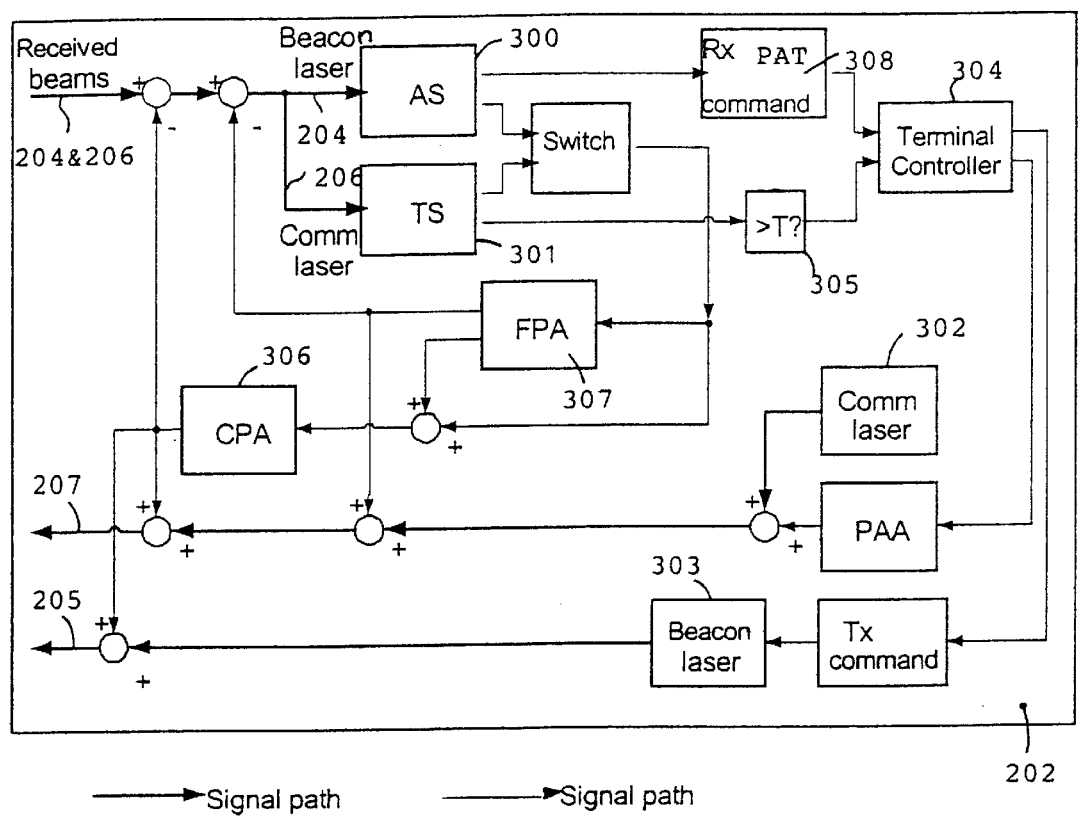
FIG. 21 illustrates the alignment block diagram of an optical terminal of a satellite, in accordance with the present invention.

A schematic picture of the PAT-system is shown in FIG. 21. During the alignment of the two terminals' line-of-sight, the terminals 200, 201 and 202, 203 are working parallel, that is, each terminal works as a transmitter (Tx) as well as a receiver (Rx) during PAT. The FIG. 21 shows the transmitter and the receiver loop for one of the terminals 202. The acquisition sensor 300 (AS) detects the light beam 204 emitted by the beacon laser at the terminal 200, 201. The beacon laser light beam 204 is used for the acquisition. As soon as the acquisition sensor 300 detects the laser spot, the acquisition starts. The position of the laser spot on the sensor 300 is input data to the Coarse Point (CPA) 306 and Fine Point (FPA) 307 controllers during the acquisition. The controllers 306, 307 are coupled to different actuator mirrors (not shown) that align the beacon optical paths (L1) 204, 205 and the communication optical paths (L2) 206, 207 for reception and transmission. The beacon laser's light beam 204 can be directed to a certain point on the acquisition sensor 300 (preferably a pixel-type acquisition sensor, for instance a CCD), with an uncertainty of less than a $\frac{1}{10}$ of a pixel. At the beginning a full frame modus is used, but as the acquisition becomes better, it may be changed to a half frame modus followed by a 10 by 10 pixel modus. In this modus, data from only 3 by 7 pixels in a 10 by 10 pixel field-of-view are collected from the sensor 300, making a higher sample rate possible. The sample rate for the 10 by 10 pixel modus may be 500 Hz. The point at which the beacon laser 204 is directed overlaps with the field-of-view of the tracking sensor (TS) 301, which has a much smaller field-of-view than the acquisition sensor 300. The tracking sensor 301 is the sensor that detects the light beam 206 used for communication purposes. In the present embodiment, communications lasers 302 are employed in both terminals 200 and 202 that emit light beams with a wavelength L2=1064 nm. The time it takes from the change to 10 by 10 modus until the acquisition is accomplished is short—about 100 ms. A requirement for the PAT-system, according to the present invention, is that when one terminal 202 has acquired the beacon laser's light beam 204 the counter terminal 200 must acquire the beacon laser's light beam 207 within less than one second.

A small mounting tolerance between the two lasers 302 and 303 on the transmitter terminal side 202 has to be allowed, resulting in slightly non-parallel laser beams 205 and 207. Due to the large distance between the two terminals 200 and 202, the tracking sensor 301 might not have detected the communication laser's light beam 206, even though the acquisition of the beacon laser's light beam 204 is accomplished.

The communication laser of the terminal 200 then makes a slow scan in a so-called Beam Trapping mode until the tracking sensor 301 of the partner satellite's terminal 202 has detected the laser light beam 206. The scanning would be facilitated if the controller at the terminal 200 got feedback from the tracking sensor 301 on the partner terminal 202. It is therefore desirable to use the beacon laser as a feedback link 205 for transmission of PAT-commands, including especially the measured intensity. By modulating the intensity of the beacon laser this information could be transmitted over this optical beacon path 205. When the tracking sensor 301 has detected the communication laser's light beam 206, the terminal 202 switches to the tracking sensor 301 as input source to the pointing terminal controllers 304 and switches to the tracking mode.

The controller 304 sends instructions to the actuator (not shown) of the communications laser 302 to move a fixed angle in one of four possible directions —right, left, up or down. The counter terminal 200 can only describe the current performance of the communication laser 302 acquisition as good or bad or something in between. It can not judge in which direction the communication laser 302 has to be moved. The intensity function of the communication laser's beam 207 in spatial coordinates looks like a Gaussian function, and the goal is to move the laser 302 in such a position, that the maximum intensity value of the laser is in the center of the receiver sensor at the terminal 200. Since it is only known how far away one is from the center, and not in which direction the center lies, a proportional regulation is impossible. Instead, the controller 304 takes small steps in a specific direction as long as it moves the laser 302 towards the center of the remote terminal's receiver sensor. After each step, which may have a fix step size, the controller 304 waits for the response from the counter terminal 200. From this response, a new instruction is calculated. The whole process runs in two axes. The time it takes for the response to reach the terminal can be calculated.

The shorter one makes the time between these instructions, the faster the communications laser acquisition will be. It is therefore desirable to minimize any delays. The time delay to the light transmission and the electronics is given. To obtain the highest possible regulation frequency, one can minimize the bit length.

An Indium-Gallium semiconductor laser may be used as beacon laser 303. The divergence of the laser's output beam 205 is large with full width half maximum angles up to 40 degrees in perpendicular axis and up to 10 degrees in parallel axis resulting in an elliptical beam spot. This beam 205 has to be narrowed to a parallel beam by collimating lenses in the transmitter (not shown in FIG. 21).

A small divergence of the beams 204 and 205 will always be present and because of the long distance between transmitter terminal 200 and receiver terminal 202, the laser spots will be much larger than the receiver antenna 203 and 201, respectively. Compared to the communications laser 302, which has a Gaussian intensity distribution, the spot of the beacon laser 303 at the antenna 201 has the shape of a top hat. Small deviations from a perfect top hat shape can though lead to slow fluctuations in the detected power when the laser spot moves.

A Charge Coupled Device, or shorter CCD, is a device that uses the photoelectric effect to generate a picture from the incident light. The acquisition sensor 300 and the tracking sensor 301 may comprise CCD sensors. Preferably, they comprise Frame Transfer (FT) CCD sensors.

Except of the noise introduced by the lasers, the major part of the noise arises in the optical sensors 300 and 301, in this case the CCD sensors. The noise affecting the channel, that is, the optical transmission through space, is multiplicative disturbances in form of signal attenuation and random phase delays. These disturbances could though be neglected compared to the disturbances in the photodetecting process. The output of the CCD is an analog video signal, which in the present embodiment is sampled and then quantized to an eight bit value before detection of the transmitted data stream 208. This adds a quantization noise to the signal.

The bandwidth of the inter-satellite communication system is strictly limited by the sampling rate of the sensors. Since one can use the whole bandwidth available, it is unnecessary to modulate the signal on a carrier light wave. Hence, a baseband transmission link can be established between the two terminals 200 and 202. In order to transmit data over a channel (service channel), the transmitted signal must be modulated by the transmitter. The detected signal is then demodulated and—to ensure correct interpretation of the transmitted data 208—the receiver 202 must be synchronized with the transmitter.

Binary symbols are represented by pulses in order to transmit them over a baseband channel. This is referred to as baseband modulation. In order to be able to track the beacon laser's light beam 204 only a small fraction of the total energy in the beacon laser is used for modulation. Without modulation, the highest possible power would be transmitted to facilitate the tracking. That is, one can only vary the amplitude by decreasing the amplitude level. To achieve symbol synchronization, a so-called early late gate may be used and, when using this synchronization method, bipolar modulation is convenient, where a logical "1" is represented with a positive pulse and a logical "0" with a negative pulse.

Detection is the process of extracting the transmitted data stream from the incoming signal. The detector observes the incoming signal by filtering and sampling the signal to get a single value, and then makes a decision about which symbol was transmitted. This process is impaired with errors due to the noise added to the signal during the transmission. In order to minimize the error probability, the detection process can be optimized with respect to the signal-to-noise ratio (SNR). This can done by using a matched filter 305, for example.

The matched filter 305 is used as detector filter. The impulse response of the filter 305 is a mirrored, delayed copy of the signal, which the filter is matched to. The filter response is then sampled at time T and the combination of a matched filter 305 and sampling is equivalent with the function of a correlator.

If a filter set is used in the detector where the filters are matched to the orthonormal basis functions spanning the signal room, the outputs from the filters give the coordinates for the transmitted signal, projected onto the signal space. Since there is only one basis function in this case, only one matched filter 305 is required in the detector. The transmitted symbol is distorted by noise, and therefore the coordinate of the received symbol will differ from the coordinate of the transmitted symbol. If both symbols are transmitted with the same probability, the best guess is to select the symbol closest to the received symbol. If the channel is only affected by additive white Gaussian noise (AWGN) with power spectral density $N_0/2$, the error probability can be determined. Since the transmitted signal is sampled by the CCD, it is necessary to use a sampled matched filter 305 or correlator for the present applications. Using a correlator, or equivalent a matched filter 305, one can increase the SNR.

The receiver 308 will not be able to detect the data stream 208 without information about the start and stop time of each symbol transferred. The detector of the partner terminal 202 therefore has to be synchronized with the transmitter of the terminal 200 in some way. A straight forward way of symbol synchronization is to transmit a clock signal together with the data signal 208. But this would cost extra energy, which is not used for anything but the synchronization, something that is undesirable for satellite applications. Besides, there is no available channel between the satellite terminals 200 and 202 for the transmission of a clock signal. Another approach is to extract the clock from the transmitted data sequence 208. A commonly used device for symbol synchronization is the above-mentioned early-late gate.

The early-late gate provides solid phase lock for a noisy signal. The fastest synchronization is reached with return-to-zero (RZ) modulation, but the early-late gate also works well for non-return-to-zero (NRZ) modulation. An advantage with NRZ modulation in this case is that it gives a higher bit energy for a given amplitude than the RZ modulation leading to a smaller error probability. The function of the early-late gate can be implemented in hardware.

Figure 22:
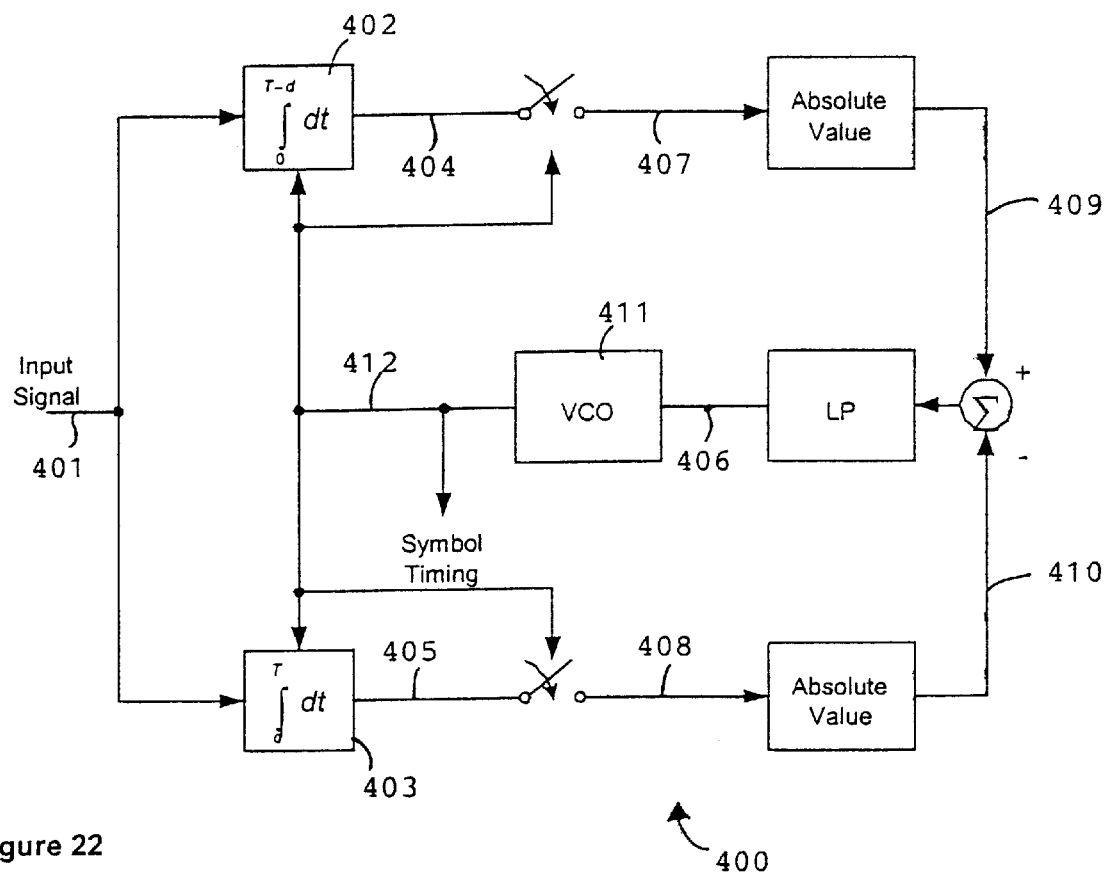
FIG. 22 illustrates an early-late gate subsystem for symbol synchronization, according to the present invention, of the terminal of a satellite.

The function of the early-late gate 400 is schematically illustrated in FIG. 22. The input signal 401 is integrated separately over two (T−d) seconds intervals every T seconds, where T is the pulse duration. The first integrator 402, the early gate, integrates the signal 401 between t=0 and t=T−d, and the second integrator 403, the late gate, integrates the signal 401 between t=d and t=T with respect to the receiver clock. The output 404 and 405 of the two integrators 402, 403 can be interpreted as the output of the input signal 401 filtered with a filter having an impulse response sampled at time t=T−d and t=T. When the receiver clock is synchronized with the input signal 401, the output samples will be equal. Otherwise, the difference of the two samples 407, 408 will be a measure of the phase error. Using the absolute values 409, 410 of the samples 407, 408 ensures that the difference 406 of the two samples 407, 408 has the same sign as the phase difference, also when the input signal 401 is a negative pulse. The difference 406 between the two sample values 407, 408 is then used to control a VCO 411, which generates the clock signal 412. Using unipolar modulation there would only have been pulses for logical "1" leading to a slower synchronization.

Symbol synchronization ensures that the receiver of one terminal is phase locked with the transmitter of the other terminal and thereby that one can detect the transmitted data stream. But a detected stream of binary symbols does not make any sense if one does not know where the data stream 208 or 209 begins. To solve this problem, one can employ another type of synchronization, referred to as frame synchronization. This is usually done by transmitting a syncword before the data stream 208 or 209 is transmitted. For longer data sequences, data are divided into frames and a syncword is then transmitted at the beginning of each frame, hence the name frame synchronization.

The syncword is stored in the detector and the incoming sequence is compared with this stored syncword. The syncword has to be long enough to minimize the risk of a randomly generated syncword in the data sequence. Since bit errors are introduced during transmission, one cannot assume a perfect match between the transmitted syncword and the stored copy. Some bit errors must therefore be accepted in the comparison.

There is a tradeoff between the risk of missing a true syncword and the risk of false alarm and it is a typical task for the designer of a communication system to find an acceptable compromise. The comparison between the detected sequence and the syncword is made after each detected symbol. When the syncword is approaching, there will be an overlap between the syncword in the data stream and the stored syncword. How the syncword is chosen has an impact on the likelihood of false alarms.

Many different groups or categories of syncwords are known in the art. Most of the known syncwords can be used in connection with the present invention. The circuitry has to be adapted accordingly.

Before the data stream 208 can be detected by the terminal 202 or data stream 209 can be detected by the terminal 200, the reference level of the transmitted signal must be calculated and subtracted from the received signal. When using bipolar modulation, each transmitted pulse has a mean value that differs from zero. If the signal interval that the calculation of the reference level is based on consists of different amounts of ones and zeros, the reference level will differ from the current mean value. Therefore, considerations must be taken to the received data stream when calculating the reference level. But since a correct detection of the data stream is not possible until the reference level has been calculated and phase lock is achieved, a specific data stream known by the receiver must be transmitted until this is accomplished. When the signal level is measured fluctuations of the received signal caused by the acquisition sensor are observed. Because of these fluctuations the calculated reference level must be refreshed with a certain interval. A possible solution is to use a sliding average window with a compensation for transmitted data.

The calculations of the reference level are based on a limited amount of data affected by noise. Therefore, also the estimated reference level will be affected by noise. If AWGN is assumed, the samples are independent and the noise level of the output signal from a sliding average window with a width equal to N can be calculated.

The estimation of the reference value is based on previous sample values and if the mean value increases or decreases monotonously during a certain interval, a deviation from the true level is unavoidable. This error increases with the size of the window. The window also works as a low pass filter, and a large window cannot compensate for fast fluctuations. On the other hand, a large window is necessary to achieve a low variance of the estimated level. Accordingly, there is a tradeoff between output variance and the bandwidth. Therefore, the window size must be chosen so that the total error is minimized.

It is often the case that the level of the noise affecting the channel is so high that it is not possible to reach a sufficiently low bit error rate for the data rate desired. The solution then is to use appropriate error-correcting codes. This kind of coding is referred to as channel coding. Channel coding is the process of adding redundancy in a controlled way to make error correction possible. Appropriate encoders and decoders are employed in the transmitters and receivers, respectively.

If the partner terminal 202, 203 detects the very narrow second light beam 206, the first terminal 200, 201 is informed by sending appropriate frames 209. This allows the first terminal 200, 201 to switch off the actuators which cause the scan movement of the optical head. In a subsequent step, the optical head of the partner terminal 202, 203 now performs a scan movement with a very small scan excursion. This scan movement allows to optimize the alignment of the second terminal 202, 203 with respect to the first terminal 200, 201, and to mitigate bias error impacts.

A light beam 207 with narrow beam width is also transmitted from the partner terminal 202, 203 to the first terminal 200, 201. The wavelength of the light beams 206 and 207 is L2.

For the exchange of nominal data, the light beams 206 and 207 are used. The beacon light beams 204 and 205 can be turned off. This allows to save energy, which is important in satellites with limited power resources.

According to a preferred embodiment of the present invention, only a small fraction of the beacon light beams 204 and 205 (between 0,5% and 5%) is used for the service channel. Preferably, about 1% of the light beams energy is used for the service channel.

According to another embodiment, the wavelength L1 of the light beams 204, 205 and the wavelength L2 of the light beams 206, 207 are the same, i.e., L1=L2. It is not mandatory that two different wavelengths are used. It is possible to perform the acquisition procedure according to the present invention by using only one wavelength for the coarse acquisition and for the fine alignment.

The scheme described and claimed herein allows to establish an optical high precision tracking loop, using both, direct detection sensors and coherent detection sensors in the feedback branch of the beam steering control loop of the partner satellite terminal receiving the light beams from the first satellite terminal.

What is claimed is:

1. A method for implementing the interruption-proof operation of optical communication links between satellites in satellite networks comprising the steps of:

emitting a beacon light beam having a large beam width from an optical terminal on a first satellite;

detecting said first satellite beacon light beam using an optical detector on a second satellite;

emitting from an optical terminal on said second satellite in the direction of said first satellite a responsive beacon light beam having a large beam width;

detecting said second satellite responsive beacon light beam using an optical detector on said first satellite;

using information from the optical detectors on said first and second satellites to adjust the direction of beacon light beam emission to achieve an acceptable degree of alignment between the optical terminals on said first and second satellites;

after said acceptable degree of alignment has been achieved, emitting a narrow width optical beam from said first satellite optical terminal toward said second satellite;

using said beacon light beams from the optical terminals of said first and second satellites to establish a service channel to aid in the continued alignment of said optical terminals so that said narrow width beam from said first satellite optical terminal can be adequately received by an optical detector on said second satellite.

2. The method of claim 1, whereby appropriate error-correcting codes for the inter-satellite communication are applied on the service channel.

3. The method of claim 1, whereby the optical detector on said first satellite includes a scanning optical head.

4. The method of claim 1 wherein the optical communication link between said first and second satellites is used for the transfer of data.

5. The method in accordance with claim 4, wherein for the service channel between said first and second satellites, a small fraction of the light beam emitted by the first satellite terminal is received by said detection sensor of the second satellite and a modulation scheme is applied to said small fraction of the beacon light beam emitted by the first satellite.

6. The method of claim 4, whereby the narrow width beam is used for the transfer of data.

7. The method of claim 4, whereby the beacon light beam from said first satellite can be turned off during the transfer of data.

8. The method of claim 1, whereby the narrow width beam from said first satellite makes a slow scan until the optical detector on said second satellite has detected said narrow width beam.

9. The method of claim 1, whereby said beacon light beam service channel is used to create a feedback loop to overcome microvibrational impacts on the pointing accuracy of said narrow width beam.

10. The method of claim 1, whereby said narrow width beam has a beam width that is between 50 and 1000 times narrower than the beam width of said first satellite beacon light beam.

11. The method of claim 1, whereby only a small fraction of the total energy emitted by the beacon lasers is used for transmission of the service channel information.

12. The method of claim 1, whereby the beacon light beam is emitted from said first satellite at one wavelength and said narrow width beam is emitted from said first satellite at a different wavelength.

13. The method of claim 1, whereby the beacon light and narrow light beams emitted from said first satellite are at the same wavelength.

\* \* \* \* \*